United States Patent [19]
Eggenberger

[11] 3,709,626
[45] Jan. 9, 1973

[54] DIGITAL ANALOG ELECTROHYDRAULIC TURBINE CONTROL SYSTEM

[75] Inventor: Markus A. Eggenberger, Schenectady, N.Y.

[73] Assignee: General Electric Company

[22] Filed: Sept. 16, 1971

[21] Appl. No.: 180,999

[52] U.S. Cl. ............................................. 415/17
[51] Int. Cl. ............................................. F01b 25/02
[58] Field of Search .......................... 415/13, 17

[56] References Cited

UNITED STATES PATENTS

| | | | |
|---|---|---|---|
| 3,233,413 | 2/1966 | Wagner et al. | 415/17 |
| 3,446,224 | 5/1969 | Zwicky, Jr. | 415/17 |
| 3,552,872 | 1/1971 | Giras et al. | 415/17 |
| 3,564,273 | 2/1971 | Cockrell | 415/17 |
| 3,572,958 | 5/1971 | Jensen | 415/17 |
| 3,588,265 | 6/1971 | Berry | 415/17 |

*Primary Examiner*—C. J. Husar
*Attorney*—William C. Crutcher et al.

[57] ABSTRACT

An electrohydraulic control system for a steam turbine has steam valve actuators with analog valve position set points or reference values supplied by a main control loop with a digital computer. The digital computer performs complex calculations to obtain the valve position set points in accordance with operating parameters of the steam turbine and desired operational modes. A standby analog control loop furnishes a simple speed and load control function in the event of loss of digital signals. When in digital computer mode, the analog speed loop provides a safety backup function through a "dead band" which provides valve closing signals upon excessive speed. In the analog or standby mode, a load reference signal representing the most recent load set point is supplied to the analog control loop from a memory unit constantly updated by the digital computer.

5 Claims, 2 Drawing Figures

PATENTED JAN 9 1973 3,709,626
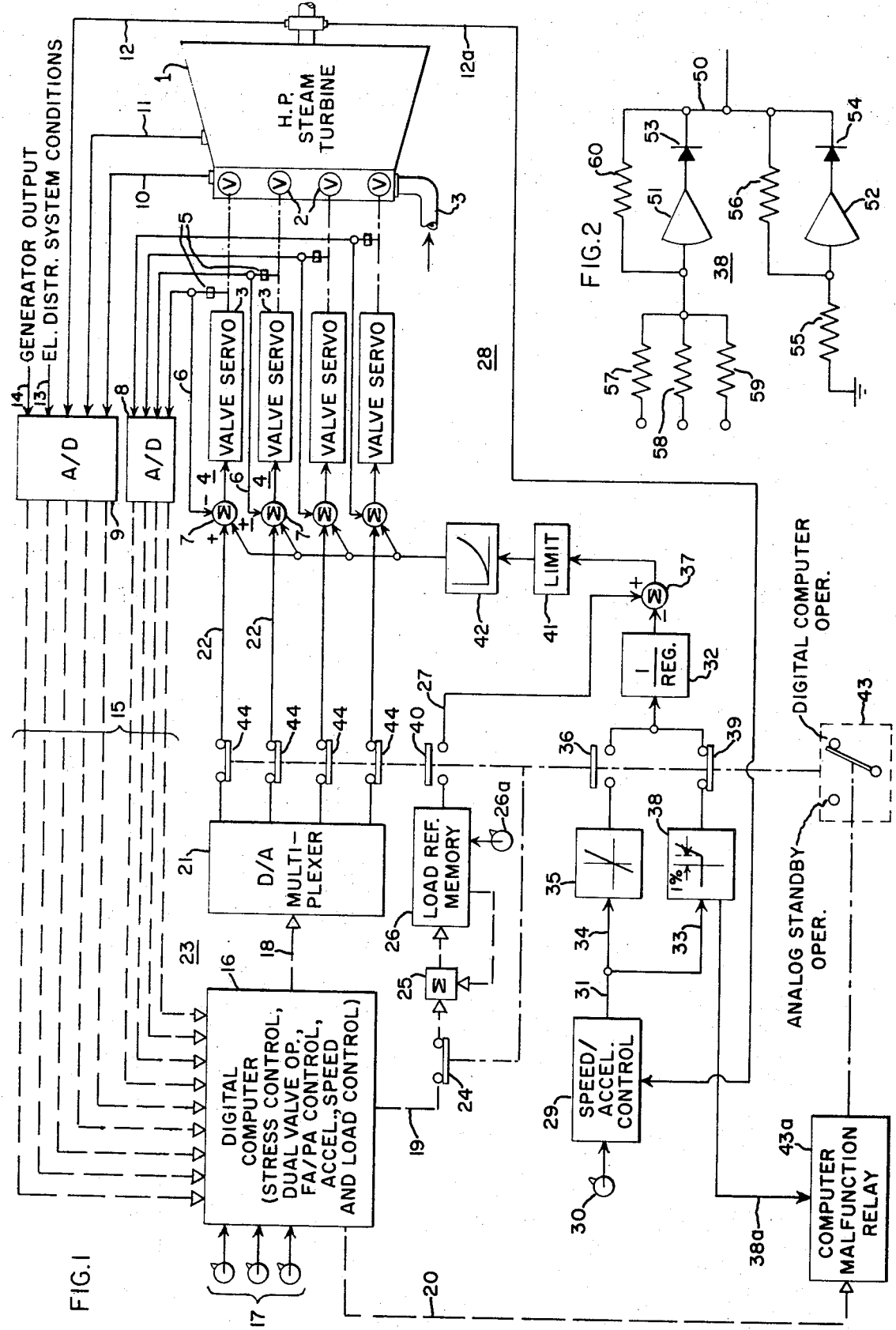

DIGITAL ANALOG ELECTROHYDRAULIC TURBINE CONTROL SYSTEM

BACKGROUND OF THE INVENTION

This invention relates generally to control systems for prime movers wherein electrical signals are supplied to actuators which control the supply of energy to the prime mover. More particularly, the invention relates to electrohydraulic control systems, wherein hydraulic steam turbine valve actuators are positioned by analog position set points obtained from either digital or analog sources.

As the complexity of the control function in large steam turbine-generator power plants has increased, the controls have become more complicated. Controls have evolved from simple mechanical/hydraulic speed governors, to analog electrohydraulic control systems involving solid-state electronic components furnishing signals to high-pressure hydraulic valve positioning servo mechanisms. Even greater increased complexity has involved the use of central power station digital computers to perform telemetering and turbine start-up and synchronizing. Although the necessity for rapid positioning of the steam valves has favored retention of analog closed loop control for the valve positioning mechanisms, digital computers have been suggested as a means to perform more complex calculations with greater flexibility in some areas of the total control loop.

Although digital computers are quite reliable and have internal self-checking circuits, increased reliability is attended by increased cost. Furthermore, failure of the computer or loss of signals, parity bit errors and so forth could result in overspeeding and extensive damage to the steam turbine power plant. It would be desirable to have a control system in which complete loss of the digital computer, while inconvenient, would nevertheless leave a standby simple control system in operation to protect the steam turbine and perform basic control functions. Also, it would be desirable to switch from digital computer (or primary control) mode to the standby control system when the computer self-diagnosing circuits indicated that something was wrong, but it would also be desirable to have an emergency backup control while still functioning in computer mode.

Accordingly, one object of the present invention is to provide an improved electrohydraulic control system with a primary digital control and a standby analog control.

Another object of the invention is to provide an improved electrohydraulic control system wherein a primary digital computer control is backed up by an analog control, whether or not there is any indication of digital computer failure.

SUMMARY OF THE INVENTION

Briefly stated, the invention is practiced by providing a primarily digital outer loop supplying analog valve position reference signals to a steam valve actuator inner loop, and a standby analog outer loop with provision for supplying alternate analog valve position reference signals to the same analog inner loop. The analog outer loop injects a "dead band" valve closing signal when the digital outer loop is functioning. When the analog outer loop is in control, a turbine load reference is supplied from a memory device which has been previously updated by a digital computer.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified, schematic diagram of a digital/analog steam turbine control system, and FIG. 2 is a circuit schematic of a suitable "dead band" device.

DESCRIPTION OF THE PREFERRED EMBODIMENT

Referring now to the drawing, a high-pressure steam turbine 1 has steam control valves 2 for controlling the admission of steam from inlet pipe 3. Steam turbine 1 is representative of a much more complicated fossil or nuclear steam turbine power plant including several sections of reheat or lower pressure turbines (not shown) or in its broader sense is representative of other types of prime movers with means to control the release of energy to the prime mover. For example, the steam turbine might be a gas turbine and steam valves 2 would then represent devices controlling the flow of fuel to the combustion chambers.

The individual steam valves 2 are positioned by electrohydraulic valve servo mechanisms 3, each having an inner analog closed loop control 4. The valve positioning servo mechanisms 3 are known to those skilled in the art and include operational amplifiers controlling pilot valves which, in turn, control high-pressure hydraulic fluid to hydraulic rams positioning the steam valves. Examples of such electrohydraulic valve positioning servo mechanisms may be seen in U. S. Pat. No. 2,977,768 — Wagner et al. and U. S. Pat. No. 3,407,826 — Wagner, both assigned to the present assignee. Position transducers 5 serve to provide feedback signals 6 to summers or comparator circuits 7 for each of the analog inner loops 4. Thereby valve positioning signals (or "set points" or "reference values") applied to the comparators 7 will serve to obtain a corresponding position of steam valves 2 as is known in the art, the sign convention chosen for the block diagram of FIG. 1 being such that a plus signal represents a more open valve position.

The valve feedback position signals are also supplied to an analog-to-digital converter 8. Other operating parameters of the steam turbine and associated power plant equipment are applied to a similar analog-to-digital converter 9. The operating parameters indicated are merely representative, but may include steam chest pressure indication 10, casing temperature 11, turbine speed 12, miscellaneous other operating parameters such as electrical distribution system conditions at 13, and generator output 14.

The convention adopted herein is that solid lines represent analog or continuous signals, dashed lines represent digital or intermittent signals, and dot-dash lines represent mechanical linkages.

In analog-to-digital converters 8, 9, the analog signals are converted to corresponding digital feedback signals by conventional means such as an analog-to-digital (A/D) converter known to those skilled in the art. The digital signals are indicated at 15 and are supplied to a digital computer 16 which may be either wired logic or programmable. Operator-selected input settings are indicated at 17, such as desired speed, desired load, desired speed or loading rate, etc., these being set in accordance with the desired operation of steam turbine 1. A time-sequenced valve positioning output signal 18 is produced by internal computer calculated functions later to be discussed. A digital output signal 19 representing reference or desired load on the steam turbine is separately supplied. Lastly, an output signal 20 indicative of a computer malfunction obtained through internal self-checking circuitry is provided.

The digital time-sequenced valve position signal 18 is supplied to a digital-to-analog multiplexer 21 which separates the signals intended as set points to the separate valve servo mechanisms and converts these back to analog or continuous signals. These are applied to the summing comparators 7 via analog input lines 22.

The afore-described elements comprising the digital computer 16, multiplexer 21, valve positioning inner loops 4, turbine 1, and the various analog feedback signals, analog-to-digital converters 8, 9, and digital signals 15 represent an outer closed loop designated generally as 23. Although the outer loop 23 is a "hybrid" in control terminology since it contains both digital and analog portions, it will be referred to hereinafter as a "digital outer loop" in order to distinguish it from the standby "analog outer loop" later to be discussed.

The various valve positioning signals calculated in computer 16 represent the result of complex calculations involving many of the system operating parameters and the valve positions. By way of example, the following prior art is exemplary of valve positioning functions designed to accomplish specified purposes.

The valves may be positioned either in full arc or in partial arc steam admission modes as shown in U. S. Pat. No. 3,403,892 — Eggenberger et al. More rapid start-up may be achieved by controlling in modes intermediate between full arc and partial arc as discussed in U. S. Pat. No. 3,561,216 — Moore. During start-up, turbine stresses may be the limiting factor as described in U. S. Pat. No. 3,446,224 — Zwicky. Early valve actuation dependent upon external conditions in the electrical power system may be incorporated as described in U. S. Pat. No. 3,601,617 — DeMello et al.

When the prime mover and its generator are connected to a large electrical system, the speed of the prime mover is relatively fixed and the valve movements serve merely to increase or decrease load on the unit. Therefore, in accordance with the teachings of U. S. Pat. No. 3,097,488 — Eggenberger, which is incorporated herein by reference, speed reference set points and load reference set points, representing desired speed and load, respectively, are separately set or calculated and then combined according to the Eggenberger patent. Accordingly, the digital valve position signal at 18 from the digital computer 16 reflects the combined effects of speed and load reference signals.

Digital signal 19 from the computer is representative only of the desired load or load reference set point. The signal from 19 is supplied through a switch 24 to a conventional digital summing comparator 25 such as an up-down counter and the difference or output signal is supplied to a load reference memory unit 26. The load reference memory unit 26 may take many conventional forms. For example, it may be a stepping motor or it may be accomplished by storing a charge on a capacitor in an electrical circuit. The memory unit is also arranged to supply an analog output signal 27 which corresponds to the most recent value of the digital load reference signal 19. This may be accomplished by a variable reluctance differential transformer and demodulator combination driven by the aforementioned stepping motor, or it may be simply a voltage divider supplied by the aforementioned charge on a capacitor. Means indicated by manual input knob 26a are provided for changing the analog load reference signal manually once the positioning control 25 has been disconnected from the digital computer by switch 24. Many such arrangements are known to those skilled in the art and the details are not material to the present invention.

In addition to the before-described digital outer loop, the invention includes a standby analog outer loop shown generally as 28. An analog turbine speed signal 12a, which may be identical to the speed signal 12 is supplied to a speed and acceleration control 29 with operator controlled speed reference set point 30. The speed and acceleration control 29 may vary in complexity from a simple summing operational amplifier to an analog control with redundant speed and acceleration channels as more particularly described in U. S. Pat. No. 3,340,883 — Peternel which is incorporated herein by reference.

The signal is divided into parallel or branch paths 33, 34. Path 34 may include a linear amplifier 35 supplying a linearly varying signal as the speed increases above or below a speed selected by reference 30. This signal is supplied through a switch 36 to an impedance device 32.

The other signal branch 33 goes through a "dead band" function generator 38 and a switch 39 to the same impedance device 32. Depending upon the relative positions of switches 36, 39, the speed error signal coming either from the upper or lower signal branch is multiplied by a selected gain factor in device 32 to give a desired correspondence of valve movement for a given speed change. The resulting signal is transmitted to a summer 37.

"Dead band" function generator 38, is arranged to suppress signals in the valve opening (plus) direction and to produce a signal increasing linearly in the valve closing (minus) direction only when the turbine exceeds the speed reference (or alternatively rated speed setting) by a predetermined amount, here 1 percent of turbine rated speed. The outer input to summing comparator 37 is signal line 27 from the load reference memory unit 26. This line, carrying voltage of a polarity to produce a valve opening signal, includes means for disconnecting the signal through a switch 40. The output signal from comparator 37, representing a combined speed and load reference signal is supplied through a limiter 41 and a non-linear function generator 42. Non-linear function generator 42 may be a diode circuit arranged as disclosed in the aforementioned U. S. Pat. No. 3,097,488 and is selected or adjusted to correct for non-linearity of steam flow with respect to valve movement. Thus, the output signal from function generator 42 when combined with opposite non-linearity of steam flow rate with valve movement, will produce steam flow rate which is substantially proportional to the signal from summer 37. The output signal voltage from function generator 42 is supplied in parallel to the summing comparators 7 for the valve positioning inner loops 4.

Means for switching full control of the steam turbine 1 from the primary outer loop 23 to the standby outer loop 28 includes a switching relay 43 for actuating switches to activate or deactivate the desired signals. The relay 43 controls disconnecting switches 44 for the analog valve positioning signals appearing on lines 22; it is also connected to actuate a similar switch 40 for the load reference memory output, switch 24 breaking the digital input to the load reference memory, and switches 36, 39 supplying alternate actuation of the branch paths 33, 34. The schematic representation in FIG. 1 assumes that when an analog signal is disconnected from its source, it will assume the value zero. A disconnected digital signal will remain at its most recent value. The switching relay 43 is activated manually or by a computer malfunction relay 43a which is connected so as to change the switching relay from digital computer mode to analog standby mode when a signal 20 from the digital computer indicates that a malfunction has taken place. A suitable output signal 38a from the function generator 38 is provided to actuate the malfunction relay 44 when overspeed reaches a predetermined value, say 3 percent of rated speed, causing the switching relay 43 to change into standby mode.

FIG. 2 is a simplified drawing of a dead band generator 38, although many other functionally similar types are known. A gating bus 50 is connected to the outputs of operational amplifiers 51, 52 through appropriately poled diodes 53, 54. As is known, operational amplifiers reverse polarity of the input voltage signal. Therefore, the sign convention does not necessarily correspond to FIG. 1, because several other sign reversals occur in the actual system. Only the highest positive valued signal of the two amplifiers will therefore appear on the bus 50, a positive voltage in this case being a valve closing signal. The input to amplifier 52 is grounded through an impedance 55. A feedback impedance 56 of equal value connects the input and output. Thus, the amplifier 52 has a zero output which prevents a negative-going signal on the bus.

Amplifier 51 is connected as a summing amplifier with three input impedances 57, 58, 59 and a feedback impedance 60, all of equal values. A positive speed reference signal is applied to impedance 57 and a negative signal representing actual speed is applied to impedance 58. These functions would normally be carried out in the speed and acceleration control 29 of FIG. 1 but are shown in FIG. 2 for better understanding. A positive bias signal is applied to impedance 59, depending upon the degree of dead band desired, here about 1 percent of the reference speed signal. The sum of these signals therefore appears at the output of amplifier 51.

When the reference speed matches the actual speed, the only signal output is due to the bias input. This is negative because of amplifier sign reversal. However, the other amplifier 52 prevents a negative signal on the gate bus 50. As the speed rises, the speed error signal cancels the bias signal until a positive signal (representing valve closing and not to be confused with the servo mechanism + and − symbols used in FIG. 1) appears on bus 50 and is transmitted to summing comparator 37.

OPERATION OF THE INVENTION

In operation, the steam turbine 1 is either under the control of the primary digital outer loop 23 or the standby analog outer loop 28 depending upon the position of the signal-controlling switches (24, 36, 39, 40, 44) controlled by switching relay 43. In the drawing, the switches are shown when the steam turbine is in the primary or digital computer-controlled mode. The digital valve position signal 18 through multiplexer 21 supplies analog set points for the separate valve positioning servos. The digital load reference signal 19 constantly updates the load reference memory device 26 supplying the analog load reference signal 27. However, signal 27 is zero by virtue of the open position of switch 40.

The standby analog speed control loop 28 supplies a speed error signal 31 which passes along the lower branch signal path 33 to the "dead band" function generator 38. Passage of this signal to the summer 37 is permitted as indicated by the closed position of switch 39. However, because of the dead band, the signal input to summer 37 is 0 unless the speed is above 1 percent of rated speed. In such a case, a valve closing signal is then summed with the computer-obtained set point at each of the separate valve position summing comparators 7. Therefore, even though the valve positioning signal supplied by the digital computer might apparently be correct, turbine overspeed is the ultimate measure of correctness and the "dead band" portion of the analog outer loop serves to back up and override the digital computer control by reducing the valve opening upon overspeed.

In the alternate or standby mode of operation, which is initiated either by manual actuation of switching relay 43, or by the computer malfunction relay 43a, the switches are changed as follows. The switches 44 are opened so that the analog valve set points from multiplexer 21 are zero. Switch 24 is open so that the load reference memory device is no longer changed by the computer and switch 40 is closed to initiate the analog load reference signal 27 from the memory unit as an input to summer 37.

Switch 39 is opened and switch 36 is closed, changing from the lower branch path to the upper branch 34. In this manner, a speed error signal from the speed and acceleration control 29 (modified by impedance device 32) is supplied as a second input to summer 37. combined signal, which now becomes the new analog reference set point for the valve closed loop controls passes through limiter 41, is further modified by the function generator 42 and applied to the summing comparators 7. The same signal is applied to all four valve positioning loops so that the valves open and close in unison. This is known as full-arc admission and is suitable for the simple standby speed and load control while the digital computer is out of operation.

It should be noted that in the subject invention, the digital computer 16 can be suddenly disconnected and removed from the system or otherwise completely malfunction and the turbine-generator will continue to operate under a simpler but completely safe speed and load control system. Load is changed manually by adjusting the knob 26a to the load reference memory so as to change the load reference signal.

When in the digital computer control mode, the turbine-generator safety is also backed up by the analog control loop. An output from the dead band device 38 only comes into play when a predetermined turbine overspeed is reached. This initiates valve closing signals as overspeed reaches a selected value and at some higher value operates the malfunction relay to switch to standby control by disabling the digital outer loop.

Thus, there has been shown what is considered at present to be the preferred embodiment of the invention and while other modifications may occur to those skilled in the art, it is desired to secure in the appended claims all such modifications as fall within the true spirit and scope of the invention.

What is claimed is:

1. In a control system for a prime mover having valve means controlling the supply of energy to the prime mover, the combination of:
    at least one inner closed loop arranged to position said valve means in response to an analog valve position reference signal,
    a first outer loop including a digital computer responsive to the position of said valve means and also to selected operating parameters of said prime mover,
    a second outer loop including analog control means responsive to prime mover speed and connected to supply a second signal to said inner loop through a separate signal path, said signal path including "dead band" means arranged to provide an analog valve closing signal only above a first selected overspeed, whereby said second loop serves as a standby control for said first loop and is operative to commence closing said valve means above said first selected speed.

2. The combination according to claim 1, wherein said dead band means is arranged to disable said first outer loop upon reaching a second selected overspeed, whereby the prime mover is controlled only by said second outer loop.

3. The combination according to claim 1, wherein said dead band means comprises a pair of operational amplifiers connected through diodes to a common gating bus, and wherein one of said amplifiers is connected to provide a valve closing signal above a selected overspeed bias signal, and wherein the other of said amplifiers is connected to supply a zero signal so as to suppress valve opening signals on said gating bus.

4. In a control system for a prime mover having valve means controlling the supply of energy to the prime mover, the combination of:
    at least one inner closed loop arranged to position said valve means in response to an analog valve position reference signal,
    a first outer loop including a digital computer responsive to the position of said valve means and to selected operating parameters of said prime mover, said first outer loop further connected through first switching means to supply a signal to said inner loop,
    a second outer loop including analog control means responsive to prime mover speed and connected to supply a signal to said inner loop through first and second alternate signal paths controlled by second switching means, said first signal path having dead band means to provide an analog valve closing signal only above a selected over-speed, and
    switching relay means connected to said first and second switching means to supply said valve position signal both from said first outer loop and from said first alternate signal path in the second outer loop when the control system is in a primary mode of operation and to supply said valve position signal through said second alternate signal path of the second outer loop when the control system is in a standby mode of operation.

5. The combination according to claim 4 and further including a load reference memory device adapted to receive a load reference signal from said digital computer and to generate an analog reference signal corresponding to the last-received digital load reference signal, and
    third switching means operated by said switching relay means to connect the analog load reference signal to the second outer loop second alternate path when the control system is in the standby mode of operation.

* * * * *